United States Patent
Uematsu et al.

(10) Patent No.: US 8,723,469 B2
(45) Date of Patent: May 13, 2014

(54) MOTOR WINDING OVERHEAT PREVENTION APPARATUS AND MOTOR CONTROL APPARATUS

(75) Inventors: Hidetoshi Uematsu, Yamanashi (JP); SeungJun Lee, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 3 days.

(21) Appl. No.: 13/586,120

(22) Filed: Aug. 15, 2012

(65) Prior Publication Data

US 2013/0069579 A1   Mar. 21, 2013

(30) Foreign Application Priority Data

Sep. 21, 2011   (JP) .................................. 2011-206221

(51) Int. Cl.
*G05D 23/00* (2006.01)

(52) U.S. Cl.
USPC .............................. 318/473; 318/445; 318/471

(58) Field of Classification Search
USPC .......................................... 318/445, 471, 473
See application file for complete search history.

(56) References Cited

U.S. PATENT DOCUMENTS

| 7,633,197 | B2 | 12/2009 | Isoda et al. | |
|---|---|---|---|---|
| 2003/0146725 | A1 | 8/2003 | Griesemer et al. | |
| 2005/0258786 | A1* | 11/2005 | Kellogg et al. | 318/254 |
| 2009/0009729 | A1* | 1/2009 | Sakai | 353/57 |
| 2010/0140002 | A1* | 6/2010 | Miura et al. | 180/65.285 |
| 2011/0101904 | A1* | 5/2011 | Sakamoto | 318/473 |
| 2013/0028292 | A1* | 1/2013 | Senoo | 374/183 |

FOREIGN PATENT DOCUMENTS

| EP | 1 717 932 A1 | 11/2006 |
|---|---|---|
| JP | 5-268718 A | 10/1993 |
| JP | 2000-308389 A | 11/2000 |
| JP | 2004-208453 A | 7/2004 |
| JP | 2007538489 | 12/2007 |
| JP | 4237075 B2 | 3/2009 |
| JP | 2009091990 | 4/2009 |
| JP | 2010142046 A * | 6/2010 |
| WO | 2005119888 A1 | 12/2005 |

OTHER PUBLICATIONS

Notice of Reasons for Rejection issued in Japanese Patent Application No. 2011-206221 maildate Jan. 22, 2013.

* cited by examiner

*Primary Examiner* — Kawing Chan
(74) *Attorney, Agent, or Firm* — Lowe Hauptman & Ham, LLP (57) ABSTRACT

A winding overheat prevention apparatus comprises: a stator winding temperature calculation unit which calculates winding temperature based on the ambient temperature of the motor and on the amount of change in the estimated temperature of a stator winding; a position sensor temperature detection unit which detects the temperature indicated by a temperature sensing element in a position sensor a rotor; and an alarm signal output unit which outputs an alarm signal when the winding temperature exceeds an alarm level, wherein when the ambient temperature is not higher than a prescribed temperature, the alarm level is set equal to a temperature preset based on the ambient temperature and the maximum value of the amount of the temperature change, while when the ambient temperature is higher than the prescribed temperature, the alarm level is set equal to a temperature preset in order to protect the position sensor from overheating.

8 Claims, 5 Drawing Sheets

MOTOR WINDING OVERHEAT PREVENTION APPARATUS AND MOTOR CONTROL APPARATUS

RELATED APPLICATIONS

The present application claims priority from Japanese Application Number 2011-206221, filed Sep. 21, 2011, the disclosure of which is hereby incorporated by reference herein in its entirety.

BACKGROUND OF THE INVENTION

1. Field of the Invention

The present invention relates to a motor winding overheat prevention apparatus and a control apparatus for controlling drive power to be supplied to a motor.

2. Description of the Related Art

When current flows in a stator winding of a motor, loss occurs in the stator winding, and the temperature of the stator winding rises in proportion to the loss. If the temperature of the stator winding rises excessively, the stator winding will become burned. Accordingly, when driving a motor, winding overheat prevention control for preventing the burning out of the stator winding is performed by detecting the temperature of the stator winding and by stopping the driving of the motor if the detected temperature has exceeded the upper limit temperature (hereinafter referred to as "alarm level") preset for the stator winding.

To effectively control the driving of the motor while performing control to prevent the overheating of the winding, it is indispensable to accurately detect the temperature of the winding. There are two major methods of detecting the temperature of the motor winding: one is to detect the temperature by using a temperature sensor (temperature sensing element) mounted on the stator winding, and the other is to estimate the winding temperature by calculation from the current flowing in the winding.

In one common method of estimating the winding temperature by calculation from the current flowing in the winding, the loss Q that occurs in the winding is calculated from the equation "$Q=I^2 \times R$", where I is the current flowing in the winding, which is detected by a sensing resistor, a Hall element, a current sensor, or the like, and R is the resistance of the motor winding; then, in view of the characteristic that the temperature of the stator winding rises in proportion to the loss Q, the temperature of the stator winding is estimated by multiplying the loss Q with a predetermined constant and by taking also into account the ambient temperature of the motor.

Several other methods are proposed that estimate the winding temperature more accurately by calculation from the current flowing in the winding.

For example, there is proposed a method that does not require mounting a temperature sensor on the winding but calculates the winding temperature by detecting current and voltage by using an electric circuit, as disclosed in Japanese Unexamined Patent Publication No. 2000-308389 or 2004-208453.

There is also proposed, for example, a method that measures the temperature by using a temperature sensor (temperature sensing element) mounted on the winding and that corrects the measured value by a value determined by a quadratic function of the value of the current flowing in the winding, as disclosed in Japanese Patent No. 4237075.

There is further proposed, for example, a method that detects actual winding temperature by using a temperature sensor mounted on the winding and that predicts the temperature of the winding from the detected actual winding temperature by using the load current and ambient temperature of the motor, as disclosed in Japanese Unexamined Patent Publication No. H05-268718.

The method that measures the temperature by using a temperature sensor (temperature sensing element) mounted on the stator winding has the advantage that the temperature of the stator winding can be measured accurately. However, since there is a need to efficiently conduct the heat from the stator winding to the temperature sensing element, a high-quality material having high thermal conductivity has to be used for the mounting and adhesive means for mounting the temperature sensing element on the stator winding, and there also arises a need to install wiring lines and connectors in order to transfer temperature information from the temperature sensing element to the control apparatus; hence, the disadvantage that the manufacturing cost increases.

On the other hand, the method that estimates the temperature of the stator winding by calculation from the current flowing in the winding offers the advantage of being able to reduce the manufacturing cost because of the elimination of the need for a temperature sensing element. According to this method, since the temperature of the stator winding is estimated from the loss Q ($=I^2 \times R$) that occurs in the stator winding, the amount of relative change in winding temperature can be calculated accurately, but since the temperature of the stator winding is estimated by adding the amount of relative temperature change to the ambient temperature of the motor, the estimated result is affected by the ambient temperature of the motor, and therefore the thus estimated temperature of the stator winding is not sufficiently accurate.

In the winding overheat prevention control performed to prevent the burning out of the winding, since the control is performed so as to stop the driving of the motor when the detected temperature of the stator winding exceeds the upper limit temperature preset for the stator winding, the driving of the motor cannot be controlled efficiently unless the winding temperature is detected accurately.

Figure 5A:
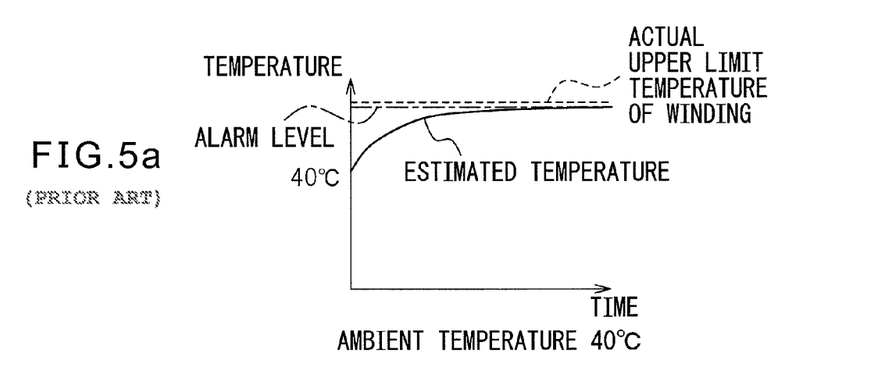
FIG. 5a is a diagram showing the relationship between the temperature estimated from current flowing in motor stator winding and the ambient temperature of the motor when the ambient temperature is 40° C. in the prior art.
Figure 5B:
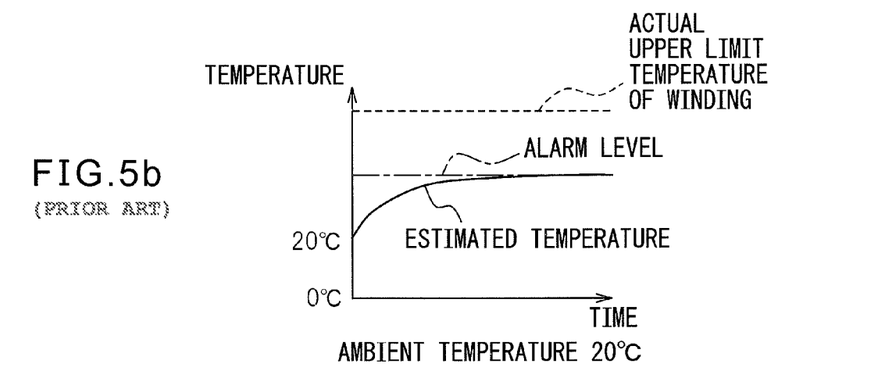
FIG. 5b is a diagram showing the relationship between the temperature estimated from current flowing in motor stator winding and the ambient temperature of the motor when the ambient temperature is 20° C. in the prior art.
Figure 5C:
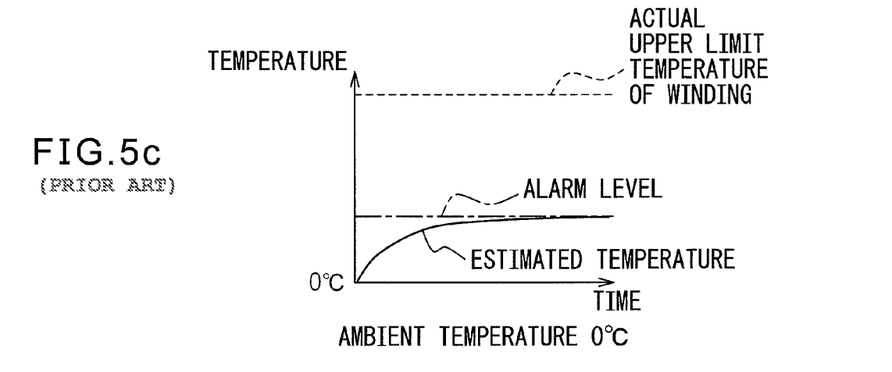
FIG. 5c is a diagram showing the relationship between the temperature estimated from current flowing in motor stator winding and the ambient temperature of the motor when the ambient temperature is 0° C. in the prior art.

In performing the winding overheat prevention control, when the method that detects the temperature of the stator winding by adding the ambient temperature of the motor to the amount of change in the stator winding temperature estimated based on the loss Q occurring in the stator winding is used as the method for detecting the winding temperature from the current flowing in the winding, the "alarm level", i.e., the upper limit temperature based on which to determine whether or not to stop the driving of the motor, is usually set based on the temperature calculated by adding the ambient temperature of the motor to the amount of temperature change that the stator winding of the motor can take and on the highest ambient temperature that can be expected to occur in the operating environment of the motor; however, according to this method, it is not possible to efficiently control the driving of the motor for the following reason. FIG. 5a is a diagram showing the relationship between the temperature estimated from the current flowing in the stator winding of the motor and the ambient temperature of the motor when the ambient temperature is 40° C. FIG. 5b is a diagram showing the relationship between the temperature estimated from the current flowing in the stator winding of the motor and the ambient temperature of the motor when the ambient temperature is 20° C. FIG. 5c is a diagram showing the relationship between the temperature estimated from the current flowing in the stator winding of the motor and the ambient temperature of the motor when the ambient temperature is 0° C.

As earlier described, the temperature of the stator winding rises in proportion to the loss Q that occurs when current flows in the stator winding of the motor. Since the loss Q that occurs in the stator winding is expressed as "$Q=I^2 \times R$", where I is the current flowing in the stator winding of the motor and R is the resistance of the stator winding of the motor, a temperature change such as shown in FIGS. 5a, 5b, and 5c occurs in the stator winding. The amount of this temperature change itself is the same irrespective of the ambient temperature of the motor, but since the temperature of the stator winding is estimated by adding the amount of this relative temperature change to the ambient temperature of the motor, the estimated result varies depending on the ambient temperature of the motor. For example, the lower the ambient temperature of the motor, the lower is the temperature of the stator winding estimated from the current flowing in the stator winding. It can be assumed that the temperature calculated by adding the maximum value of the amount of temperature change occurring in the motor to the highest ambient temperature that can be expected to occur in the operating environment of the motor represents the actual upper limit temperature of the stator winding.

For example, when the highest ambient temperature that can be expected to occur in the operating environment of the motor is 40° C., it can be assumed that the temperature calculated by adding the maximum value of the amount of temperature change occurring in the motor to the ambient temperature of 40° C. represents the actual upper limit temperature of the stator winding (the temperature indicated by dashed line), as shown in FIG. 5a. Accordingly, when the highest ambient temperature that can be expected to occur in the operating environment of the motor is 40° C., the actual upper limit temperature of the stator winding is set as the alarm level for the stator winding (the temperature indicated by semi-dashed line in the figure). As a result, when the motor is driven under the highest ambient temperature of 40° C. that can be expected to occur in the operating environment of the motor, the performance of the motor can be made maximum use of without incurring the burning out of the stator winding.

However, when the motor is driven under the ambient temperature of 20° C., the alarm level for the stator winding is shifted downward from the actual upper limit temperature of the stator winding, as shown in FIG. 5b, and when the motor is driven under the ambient temperature of 0° C., the alarm level for the stator winding is shifted further downward from the actual upper limit temperature of the stator winding, as shown in FIG. 5c; as a result, the motor cannot be driven by making full use of its performance, and the efficiency thus drops.

In this way, when performing the winding overheat prevention control using the method that detects the temperature of the stator winding by adding the ambient temperature of the motor to the amount of change in the stator winding temperature estimated based on the loss Q occurring in the stator winding, with the prior art method it is not possible to efficiently control the driving of the motor.

SUMMARY OF THE INVENTION

In view of the above problem, it is an object of the present invention to provide a low-cost winding overheat prevention apparatus that can drive a motor efficiently while preventing the overheating of motor stator winding highly accurately, and a motor control apparatus incorporating such a winding overheat prevention apparatus.

To achieve the above object, according to a first mode of the present invention, there is provided a motor winding overheat prevention apparatus comprising: a stator winding temperature calculation unit which calculates stator winding temperature based on the ambient temperature of a motor and on the amount of change in the temperature of a stator winding that is estimated from current flowing in the stator winding of the motor; a position sensor temperature detection unit which detects the temperature indicated by a temperature sensing element incorporated in a position sensor that detects positional information of a rotor of the motor; and an alarm signal output unit which outputs an alarm signal when the stator winding temperature exceeds an alarm level, wherein when the ambient temperature is not higher than a prescribed temperature, the alarm level is set equal to a temperature preset based on the ambient temperature and a maximum value of the amount of the temperature change, while when the ambient temperature is higher than the prescribed temperature, the alarm level is set equal to a temperature preset in order to protect the position sensor from overheating. The motor winding overheat prevention apparatus further includes a winding protection unit which outputs a command for cutting off drive power to the motor when the alarm signal is received from the alarm signal output unit.

The motor winding overheat prevention apparatus according the first mode of the present invention may further include a switching unit which switches the stator winding temperature to be compared with the alarm level in the alarm signal output unit between the stator winding temperature calculated by the stator winding temperature calculation unit and the temperature indicated by a temperature sensing element mounted on the stator winding.

In a second mode of the present invention, a motor control apparatus for controlling drive power to be supplied to a motor incorporates therein the motor winding overheat prevention apparatus according to the first mode of the present invention. More specifically, according to the second mode of the present invention, there is provided a motor control apparatus for controlling drive power to be supplied to a motor, comprising: a current sensing unit which detects current flowing in a stator winding of the motor; a stator winding temperature calculation unit which calculates stator winding temperature based on the ambient temperature of the motor and on the amount of change in the temperature of the stator winding that is estimated from the current detected by the current sensing unit; a position sensor which detects positional information of a rotor of the motor; a temperature sensing element which is incorporated in the position sensor; a position sensor temperature detection unit which detects the temperature indicated by the temperature sensing element; an alarm signal output unit which outputs an alarm signal when the stator winding temperature exceeds an alarm level, wherein when the ambient temperature is not higher than a prescribed temperature, the alarm level is set equal to a temperature preset based on the ambient temperature and a maximum value of the amount of the temperature change, while when the ambient temperature is higher than the prescribed temperature, the alarm level is set equal to a temperature preset in order to protect the position sensor from overheating; and a winding protection unit which outputs a command for cutting off the drive power to the motor when the alarm signal is received from the alarm signal output unit.

The motor control apparatus according to the second mode of the present invention may further include: a position sensor alarm signal output unit which outputs a position sensor alarm signal when the temperature detected by the position sensor temperature detection unit exceeds the temperature preset in order to protect the position sensor from overheating; and a position sensor protecting unit which outputs a command for cutting off the drive power to the motor when the position sensor alarm signal is received from the position sensor alarm signal output unit.

The motor control apparatus according to the second mode of the present invention may further include a switching unit which switches the stator winding temperature to be compared with the alarm level in the alarm signal output unit between the stator winding temperature calculated by the stator winding temperature calculation unit and the temperature indicated by a temperature sensing element mounted on the stator winding.

In the motor control apparatus according to the second mode of the present invention, the position sensor may be mounted in a detachable manner, i.e, the control apparatus may further include a mounting unit for detachably mounting the position sensor.

BRIEF DESCRIPTION OF THE DRAWINGS

The present invention will be more clearly understood with reference to the following accompanying drawings.

DETAILED DESCRIPTION

A motor winding overheat prevention apparatus and a motor control apparatus will be described below with reference to the drawings. It should, however, be understood that the present invention is not limited to the accompanying drawings, nor is it limited to the particular embodiments described herein.

Figure 1:
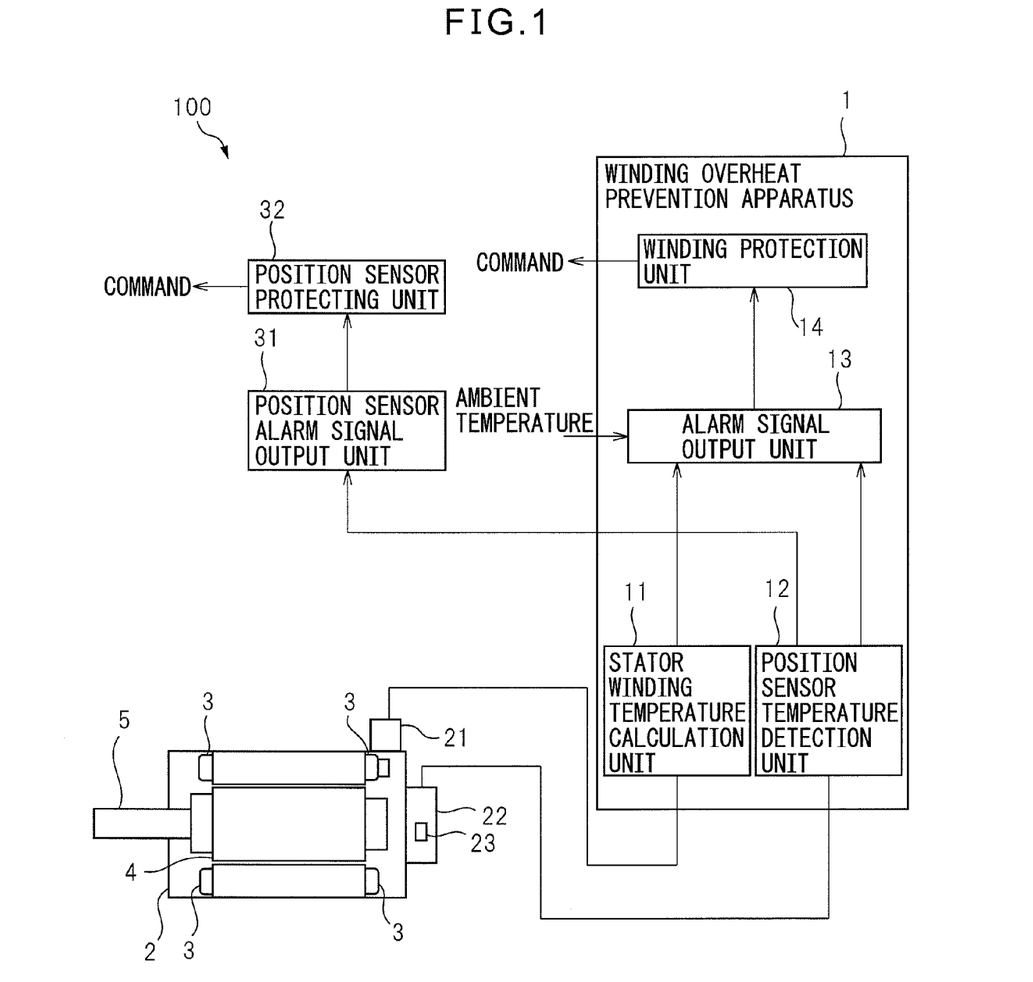
FIG. 1 is a diagram showing a motor winding overheat prevention apparatus according to a first embodiment of the present invention, and a motor control apparatus incorporating the winding overheat prevention apparatus.

FIG. 1 is a diagram showing a motor winding overheat prevention apparatus according to a first embodiment of the present invention, and a motor control apparatus incorporating the winding overheat prevention apparatus. It is to be understood that, throughout the different drawings given herein, the same reference numerals designate component elements having the same functions. Only stator winding 3, rotor 4, and shaft 5 are shown for the motor 2, and the other component elements of the motor are omitted from illustration. The following description is given for the case where the driving of the motor 2 is controlled by the control apparatus 100, but it will be recognized that the invention can be applied to the motor 2 of any type. The motor 2 is provided with a position sensor 22 for detecting positional information such as the angle, angular speed, etc., of the rotor 4. Usually, the position sensor 22 is incorporated in a temperature sensing element 23 in order to protect the components mounted on its internal printed circuit board from overheating. Accordingly, the temperature sensing element 23 is not in contact with the stator winding 3.

As shown in FIG. 1, the control apparatus 100 which controls drive power to be supplied to the motor 2 incorporates the winding overheat prevention apparatus 1. The configuration of each apparatus will be described below.

The winding overheat prevention apparatus 1 for the motor 2 includes a stator winding temperature calculation unit 11 which calculates stator winding temperature based on the ambient temperature of the motor 2 and on the amount of change in the temperature of the stator winding 3 that is estimated from the current flowing in the stator winding 3 of the motor 2, a position sensor temperature detection unit 12 which detects the temperature indicated by the temperature sensing element 23 incorporated in the position sensor 22 that detects the positional information of the rotor 4 of the motor 2, and an alarm signal output unit 13 which outputs an alarm signal when the stator winding temperature exceeds an alarm level, wherein when the ambient temperature is not higher than a prescribed temperature, the alarm level is set equal to a temperature preset based on the ambient temperature and the maximum value of the amount of the temperature change, while when the ambient temperature is higher than the prescribed temperature, the alarm level is set equal to a temperature preset in order to protect the position sensor 22 from overheating. The winding overheat prevention apparatus 1 for the motor 2 further includes a winding protection unit 14 which outputs a command for cutting off the drive power to the motor 2 when the alarm signal is received from the alarm signal output unit 13. When the command for cutting off the drive power to the motor 2 is output from the winding protection unit 14, the driving of the motor 2 is stopped. The stator winding temperature calculation unit 11, the position sensor temperature detection unit 12, and the alarm signal output unit 13 are each implemented as one of the functions of an operational processing unit incorporated in the control apparatus 100 of the motor 2. The ambient temperature of the motor 2 is detected by a temperature sensor or thermometer (not shown) provided in the vicinity of the motor 2, and the ambient temperature of the motor 2 thus detected is supplied to the alarm signal output unit 13.

The stator winding temperature calculation unit 11 estimates the temperature of the stator winding 3 from the current flowing in the stator winding 3 of the motor 2; the current to be used here is detected by a current sensing unit 21. The current detected by the current sensing unit 21 is normally used for controlling the driving of the motor 2, but in the present invention, it is also used to estimate the temperature of the stator winding 3.

As described above, according to the present embodiment, the control apparatus 100 which controls the drive power to be supplied to the motor 2 incorporates the winding overheat prevention apparatus 1. More specifically, according to the present embodiment, the control apparatus 100 for controlling the drive power to be supplied to the motor 2 includes: the current sensing unit 21 which detects the current flowing in the stator winding 3 of the motor 2; the stator winding temperature calculation unit 11 which calculates stator winding temperature based on the ambient temperature of the motor 2 and on the amount of change in the temperature of the stator winding 3 that is estimated from the current detected by the current sensing unit 21; the position sensor 22 which detects the positional information of the rotor 4 of the motor 2; the temperature sensing element 23 which is incorporated in the position sensor 22; the position sensor temperature detection unit 12 which detects the temperature indicated by the temperature sensing element 23; the alarm signal output unit 13 which outputs the alarm signal when the stator winding temperature exceeds the alarm level, wherein when the ambient temperature is not higher than a prescribed temperature, the alarm level is set equal to the temperature preset based on the ambient temperature and the maximum value of the amount of the temperature change, while when the ambient temperature is higher than the prescribed temperature, the alarm level is set equal to the temperature preset in order to protect the position sensor 22 from overheating; and the winding protection unit 14 which outputs the command for cutting off the drive power to the motor 2 when the alarm signal is received from the alarm signal output unit 13.

As an modified example of the present embodiment, the control apparatus 100 for the motor 2 may further include a position sensor alarm signal output unit 31 which outputs a position sensor alarm signal when the temperature detected by the position sensor temperature detection unit 12 exceeds the temperature preset in order to protect the position sensor 22 from overheating, and a position sensor protecting unit 32 which outputs a command for cutting off the drive power to the motor 2 when the position sensor alarm signal is received from the position sensor alarm signal output unit 31. With this configuration, the overheating of the position sensor 22 mounted on the motor 2 can also be prevented in a reliable manner. The position sensor alarm signal output unit 31 and the position sensor protecting unit 32 are each implemented as one of the functions of the operational processing unit incorporated in the control apparatus 100 of the motor 2.

Further, as an modified example of the present embodiment, the position sensor 22 may be mounted in a detachable manner, that is, the control apparatus 100 may further include a mounting unit (not shown) for detachably mounting the position sensor 22. The mounting unit may be, for example, a socket type. As earlier described, the temperature sensing element 23 is usually incorporated in the position sensor 22 in order to protect the components mounted on its internal printed circuit board from overheating. Such temperature sensing elements 23 are available in various accuracy types, and if a plurality of position sensors 22, each with a built-in temperature sensing element 23 having a different sensing accuracy, are made available for use, then the stator winding temperature calculation unit 11 can estimate the temperature with various accuracies by just changing the position sensor 22 to be mounted on the mounting unit. For example, when a position sensor 22 equipped with a low-cost, low-accuracy temperature sensing element 23 is used, the error of the temperature estimation made by the stator winding temperature calculation unit 11 becomes large, and when a position sensor 22 equipped with a high-cost, high-accuracy temperature sensing element 23 is used, the error of the temperature estimation made by the stator winding temperature calculation unit 11 becomes small. Accordingly, by suitably using the different position sensors 22, each equipped with a built-in temperature sensing element 23 having a different sensing accuracy, according to the needs, it becomes possible to flexibly apply the motor according to the purpose; for example, when mounted with a position sensor 22 equipped with a high-accuracy temperature sensing element 23, the motor 2 can be used for large current, high torque applications, and when mounted with a position sensor 22 equipped with a low-accuracy temperature sensing element 23, the motor 2 can be used for small current, low torque applications; in this way, the same motor 2 can be used in various different applications.

Figure 2:
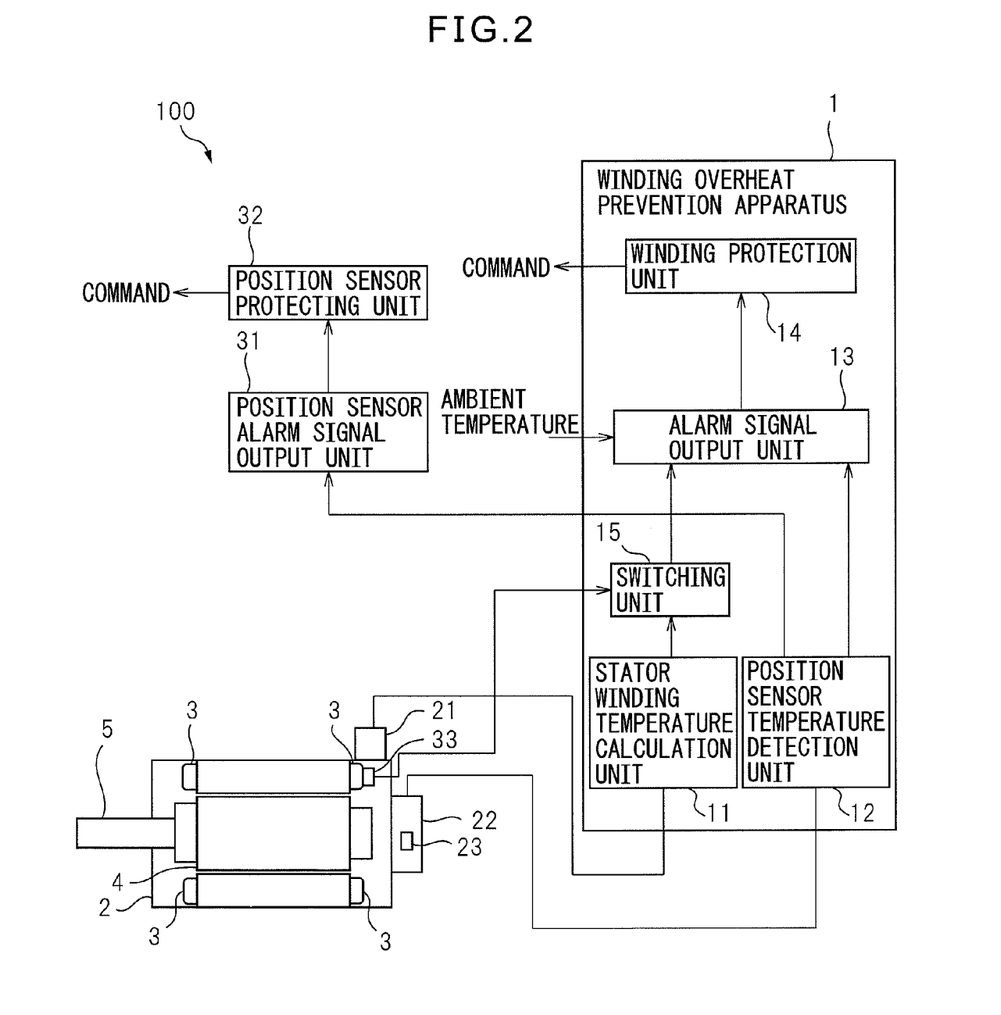
FIG. 2 is a diagram showing a motor winding overheat prevention apparatus according to a second embodiment of the present invention, and a motor control apparatus incorporating the winding overheat prevention apparatus.

FIG. 2 is a diagram showing a motor winding overheat prevention apparatus according to a second embodiment of the present invention, and a motor control apparatus incorporating the winding overheat prevention apparatus. The motor winding overheat prevention apparatus according to the second embodiment of the present invention and the motor control apparatus incorporating the winding overheat prevention apparatus can be applied for the case where a temperature sensing element is also mounted on the stator winding of the motor 2. More specifically, the winding overheat prevention apparatus 1 for the motor 2 further includes a switching unit 15 which switches the stator winding temperature to be compared with the alarm level in the alarm signal output unit 13 between the stator winding temperature calculated by the stator winding temperature calculation unit 11 and the temperature indicated by the temperature sensing element 33 mounted on the stator winding 3 of the motor 2. The switching unit 15 here is implemented as one of the functions of the operational processing unit incorporated in the control apparatus 100 of the motor 2. The other circuit component elements are the same as those shown in FIG. 1, and therefore, the same circuit component elements are designated by the same reference numerals and will not be described in detail herein. With this configuration, not only can the overheating of the stator winding of the motor 2 be prevented in a reliable manner, but the motor can be applied flexibly according to the use conditions of the motor and the user's preferences. For example, if two motors, one being a high-performance motor with a temperature sensing element directly mounted on the stator winding and the other a motor with no temperature sensing element mounted on the stator winding, are made available for use, then since the stator winding temperature to be compared with the alarm level in the alarm signal output unit 13 can be readily switched by the switching unit 15 between the temperature calculated by the stator winding temperature calculation unit 11 and the temperature indicated by the temperature sensing element 33 mounted on the stator winding 3 of the motor 2, the motor can be applied flexibly according to the purpose.

Next, the operations of the alarm signal output unit 13 and the winding protection unit 14 will be described below.

Figure 3:
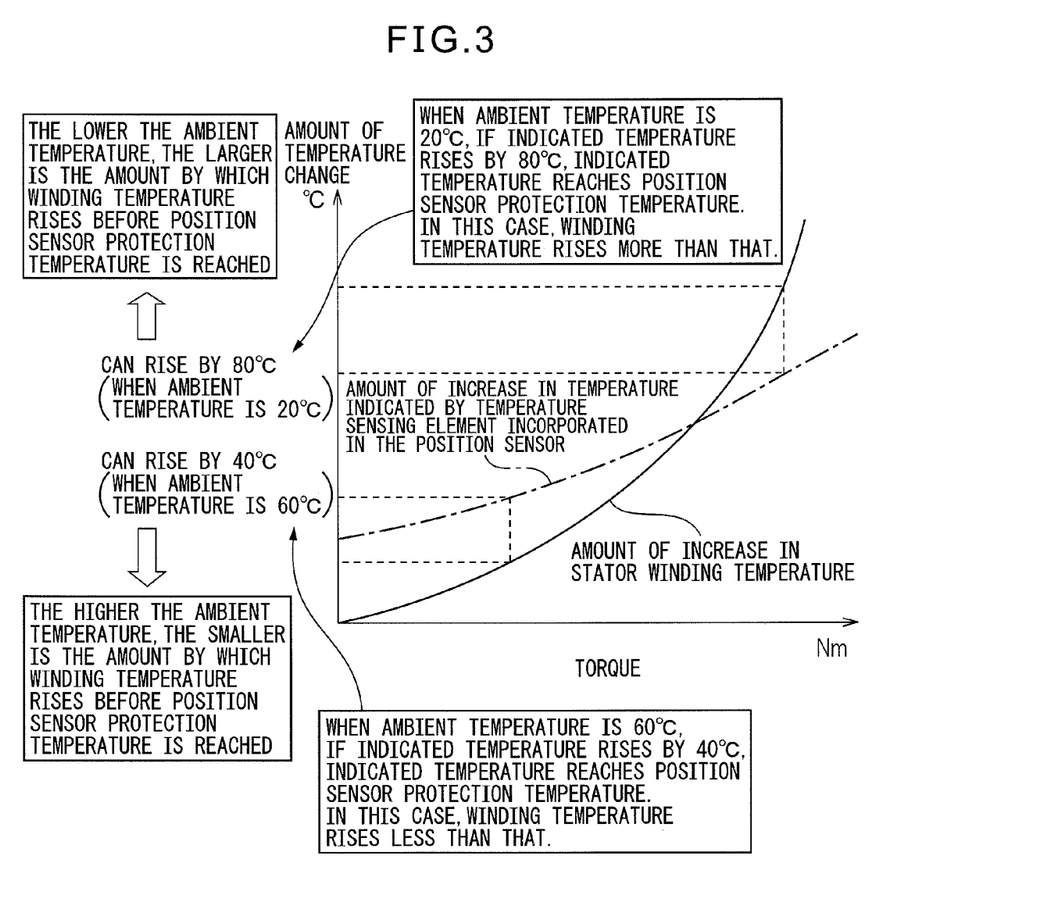
FIG. 3 is a diagram showing the relationship between the temperature of stator winding and the temperature indicated by a temperature sensing element incorporated in a position sensor according to the first and second embodiments of the present invention.

As earlier described, the temperature sensing element 23 incorporated in the position sensor 22 is normally used for detecting the temperature in the vicinity of the components mounted on the printed circuit board internal to the position sensor 22, and the temperature sensing element 23 is not in contact with the stator winding 3. Accordingly, the temperature indicated by the temperature sensing element 23 incorporated in the position sensor 22 is lower than the temperature of the stator winding of the motor 2. For example, suppose that the difference between the temperature of the stator winding of the motor 2 and the temperature indicated by the temperature sensing element 23 incorporated in the position sensor 22 is 40° C., and that the amount of temperature change that occurs in the stator winding after starting the driving of the motor 2 is 120° C.; then, when the ambient temperature of the motor 2 is 20° C., if the temperature of the stator winding rises to 140° C., the temperature sensing element 23 incorporated in the position sensor 22 indicates 100° C., and when the ambient temperature of the motor 2 is 60° C., if the temperature of the stator winding rises to 180° C., the temperature sensing element 23 incorporated in the position sensor 22 indicates 140° C. Further, since the components mounted on the printed circuit board internal to the position sensor 22 is generally less resistant to heat than the stator winding 3 of the motor 2, the temperature preset in order to protect the components mounted on the printed circuit board internal to the position sensor 22 from overheating (hereinafter called the "position sensor protection temperature") is lower than the upper limit temperature of the stator winding 3. FIG. 3 is a diagram showing the relationship between the temperature of the stator winding and the temperature indicated by the temperature sensing element incorporated in the position sensor according to the first and second embodiments of the present invention. In the graph shown in FIG. 3, the torque [Nm] is plotted along the abscissa, and the amount of temperature change of the stator winding [° C.] is plotted along the ordinate. In FIG. 3, suppose that the position sensor protection temperature preset in order to protect the components mounted on the printed circuit board internal to the position sensor 22 from overheating is 100° C. When the torque is gradually increased after starting the driving of the motor 2, the temperature of the stator winding and the temperature indicated by the temperature sensing element incorporated in the position sensor 22 gradually rise. When the ambient temperature of the motor 2 is 20° C., the temperature indicated by the temperature sensing element incorporated in the position sensor 22 can rise by 80° C. before it reaches the position sensor protection temperature of 100° C.; accordingly, when the torque is increased up to a level such that the temperature reaches the position sensor protection temperature of 100° C., a large amount of current flows during this period, and the amount of increase in stator winding temperature is also large. By contrast, when the ambient temperature of the motor 2 is 60° C., the temperature indicated by the temperature sensing element incorporated in the position sensor 22 can only rise by 40° C. before it reaches the position sensor protection temperature of 100° C.; accordingly, the amount of current required to increase the torque until the temperature reaches the position sensor protection temperature of 100° C. is smaller than when the ambient temperature of the motor 2 is 20° C., and the amount of increase in stator winding temperature is therefore smaller. This means that the lower the ambient temperature of the motor 2, the larger is the amount by which the temperature of the stator winding rises before the position sensor protection temperature is reached, and the higher the ambient temperature of the motor 2, the smaller is the amount by which the temperature of the stator winding rises before the position sensor protection temperature is reached. According, when the alarm level for the stator winding 3 is set equal to the position sensor protection temperature for protecting the components mounted on the printed circuit board internal to the position sensor 22, the stator winding temperature becomes easier to reach the alarm level as the ambient temperature of the motor 2 is higher. That is, the higher the ambient temperature of the motor 2, the smaller is the possibility of the stator winding 3 reaching its actual upper limit temperature even if the alarm level is set equal to the position sensor protection temperature for protecting the components mounted on the printed circuit board internal to the position sensor 22; it is therefore possible sufficiently to prevent the overheating of the stator winding 3 by using the position sensor protection temperature.

Accordingly, in the first and second embodiments of the present invention, when the ambient temperature is not higher than a prescribed temperature, the alarm level is set equal to the temperature preset based on the ambient temperature and the maximum value of the amount of temperature change, while when the ambient temperature is higher than the prescribed temperature, the alarm level is set equal to the temperature preset in order to protect the position sensor from overheating; then, when the stator winding temperature exceeds the alarm level, the alarm signal is output, and when the alarm signal is received, the command for cutting off the drive power to the motor is issued. With this arrangement, not only can the overheating of the stator winding of the motor be prevented in a reliable manner, but the motor can be driven efficiently.

Figure 4A:
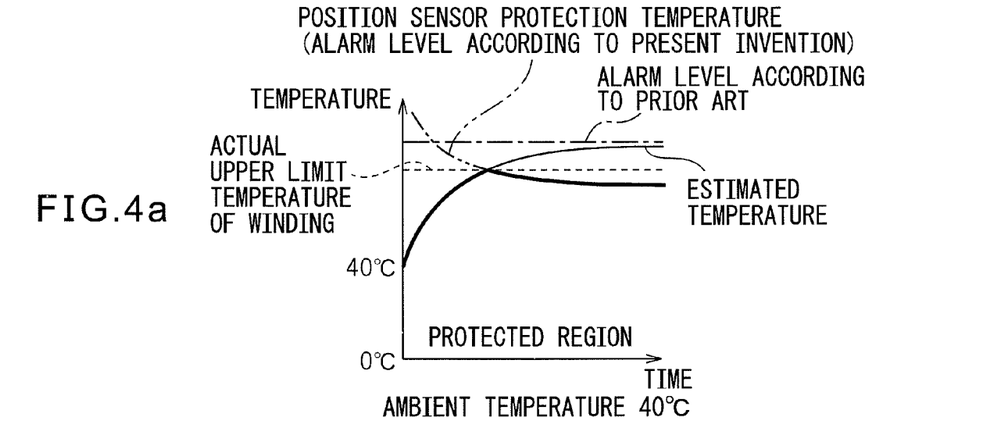
FIG. 4a is a diagram showing the relationship between the upper limit temperature of motor stator winding and the ambient temperature of the motor in the first and second embodiments of the present invention when the ambient temperature is 40° C.
Figure 4B:
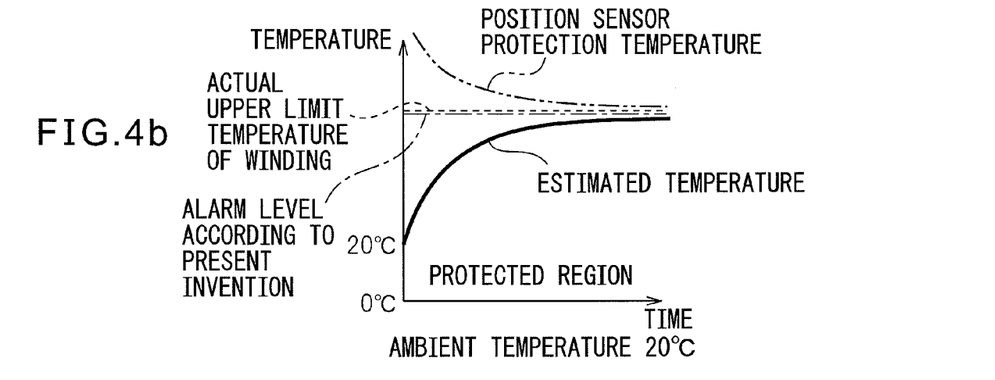
FIG. 4b is a diagram showing the relationship between the upper limit temperature of motor stator winding and the ambient temperature of the motor in the first and second embodiments of the present invention when the ambient temperature is 20° C.
Figure 4C:
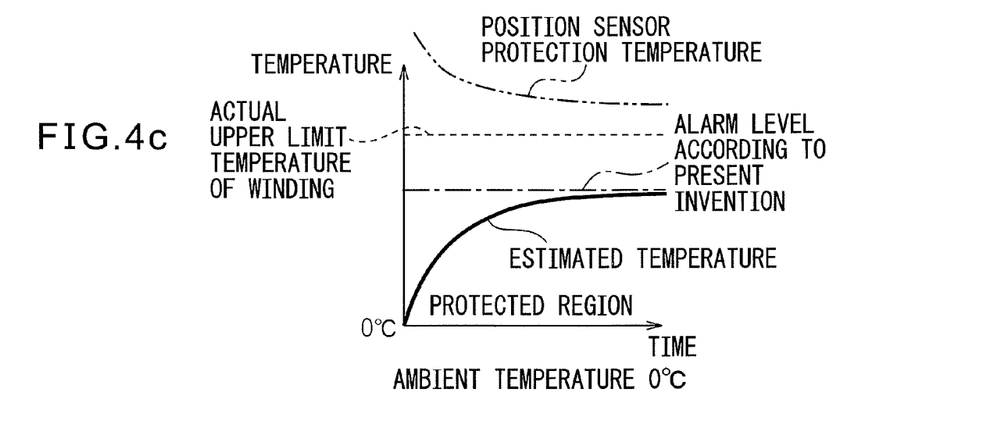
FIG. 4c is a diagram showing the relationship between the upper limit temperature of motor stator winding and the ambient temperature of the motor in the first and second embodiments of the present invention when the ambient temperature is 0° C.

FIG. 4a is a diagram showing the relationship between the upper limit temperature of the stator winding of the motor and the ambient temperature of the motor in the first and second embodiments of the present invention when the ambient temperature is 40° C. FIG. 4b is a diagram showing the relationship between the upper limit temperature of the stator winding of the motor and the ambient temperature of the motor in the first and second embodiments of the present invention when the ambient temperature is 20° C. FIG. 4c is a diagram showing the relationship between the upper limit temperature of the stator winding of the motor and the ambient temperature of the motor in the first and second embodiments of the present invention when the ambient temperature is 0° C. The "prescribed temperature" is the ambient temperature of the motor 2 that, when summed with the maximum value of the amount of temperature change of the motor 2, becomes equal to the actual upper limit temperature of the stator winding (the temperature indicated by dashed line in the figure). In the illustrated example, the "prescribed temperature" is set to 20° C., as shown in FIG. 4b. When the ambient temperature of the motor 2 is not higher than 20° C., as shown in FIG. 4b or 4c, the temperature calculated by adding the maximum value of the amount of temperature change of the motor to this ambient temperature is set as the alarm level (the temperature indicated by semi-dashed line in the figure); on the other hand, when the ambient temperature of the motor 2 is higher than 20° C., as shown in FIG. 4a, the alarm level is set equal to the position sensor protection temperature preset in order to protect the position sensor 22 from overheating (the temperature indicated by double-dashed line in the figure). In this case, when the driving of the motor 2 is started at the ambient temperature of 40° C., as shown in FIG. 4a, the stator winding temperature calculated by the stator winding temperature calculation unit 11 gradually increases with time. In the prior art method, the alarm level set equal to the actual upper limit temperature of the stator winding for the case of the ambient temperature of 20° C. is also used as the alarm level for the higher ambient temperature of 40° C.; with this setting, if the current were allowed to continue to flow in the stator winding under the ambient temperature of 40° C., the stator winding temperature would rise with time and eventually exceed the actual upper limit temperature of the stator winding. On the other hand, in the present invention, since the alarm level when the ambient temperature of the motor 2 is 40° C. is set equal to the position sensor protection temperature preset in order to protect the position sensor 22 from overheating, as shown in FIG. 4a, if the current is allowed to continue to flow in the stator winding, the stator winding temperature will soon reach the alarm level set equal to the position sensor protection temperature (the temperature indicated by double-dashed line in the figure), whereupon the alarm signal is output, and the drive power to the motor 2 is cut off, preventing the stator winding temperature from further rising, and thus avoiding the burning out of the stator winding. When FIGS. 4a, 4b, and 4c showing the first and second embodiments of the present invention are compared with FIGS. 5a, 5b, and 5c showing the prior art, it can be seen that, in the case of the ambient temperature of 0° C. shown in FIGS. 4c and 5c, the difference (error) between the actual upper limit temperature of the winding and the preset alarm level is smaller in the first and second embodiments of the present invention shown in FIG. 4c than in the prior art shown in FIG. 5c. This shows that, in the first and second embodiments of the present invention, the performance of the motor can be made maximum without burning of the stator winding.

The present invention can be applied to a winding overheat prevention apparatus for preventing motor stator winding from burning out by overheating and a motor control apparatus incorporating such a winding overheat prevention apparatus.

According to the present invention, a winding overheat prevention apparatus that can drive a motor efficiently while preventing the overheating of motor stator winding highly accurately, and a motor control apparatus incorporating such a winding overheat prevention apparatus, can be achieved.

According to the first mode of the present invention, when the ambient temperature of the motor is not higher than the prescribed temperature, the alarm level is set equal to the temperature preset based on the ambient temperature and the maximum value of the amount of temperature change, while when the ambient temperature is higher than the prescribed temperature, the alarm level is set equal to the temperature preset in order to protect the position sensor 22 from overheating; then, when the stator winding temperature exceeds the thus set alarm level, the alarm signal is output, in response to which the command for cutting off the drive power to the motor is issued. As a result, the motor can be driven efficiently while preventing the overheating of the motor stator winding in a reliable manner. Generally, the position sensor for detecting the positional information of the rotor of the motor incorporates therein a temperature sensing element for protecting the components mounted on its internal printed circuit board from overheating; according to the first mode of the present invention, since the temperature sensing element incorporated in the position sensor is used, there is no need to provide an additional temperature sensing element for the stator winding, and the overheating of the motor stator winding can be prevented in a reliable manner at low cost.

The motor winding overheat prevention apparatus according to the first mode of the present invention may further include a switching unit which switches the stator winding temperature to be compared with the alarm level in the alarm signal output unit between the stator winding temperature calculated by the stator winding temperature calculation unit and the temperature indicated by the temperature sensing element mounted on the stator winding; with this configuration, not only can the overheating of the stator winding of the motor be prevented in a reliable manner, but the motor can be applied flexibly according to the use conditions of the motor and the user's preferences.

In the second mode of the present invention, on the other hand, since the control apparatus for controlling the drive power to be supplied to the motor incorporates the motor winding overheat prevention apparatus according to the first mode, the driving of the motor can be controlled efficiently while preventing the overheating of the motor stator winding in a reliable manner. Further, since the temperature sensing element incorporated in the position sensor is used, there is no need to provide an additional temperature sensing element for the stator winding; accordingly, the driving of the motor can be controlled efficiently while preventing the overheating of the motor stator winding in a reliable manner at low cost.

The motor control apparatus according to the second mode of the present invention may further include a position sensor alarm signal output unit which outputs a position sensor alarm signal when the temperature detected by the position sensor temperature detection unit exceeds the temperature preset in order to protect the position sensor from overheating, and a position sensor protecting unit which outputs a command for cutting off the drive power to the motor when the position sensor alarm signal is received from the position sensor alarm signal output unit; with this configuration, the overheating of the position sensor mounted on the motor can be prevented in a reliable manner.

The motor control apparatus according to the second mode of the present invention may also includes a switching unit which switches the stator winding temperature to be compared with the alarm level in the alarm signal output unit between the stator winding temperature calculated by the stator winding temperature calculation unit and the temperature indicated by the temperature sensing element mounted on the stator winding; with this configuration, not only can the overheating of the stator winding of the motor be prevented in a reliable manner, but the motor can be applied flexibly according to the use conditions of the motor and the user's preferences.

Further, in the motor control apparatus according to the second mode of the present invention, the position sensor may be mounted in a detachable manner; in this case also, not only can the overheating of the stator winding of the motor be prevented in a reliable manner, but the motor can be applied flexibly according to the use conditions of the motor and the user's preferences.

What is claimed is:

1. A motor winding overheat prevention apparatus comprising:
    a stator winding temperature calculation unit which calculates stator winding temperature based on the ambient temperature of a motor and on the amount of change in the temperature of a stator winding that is estimated from current flowing in said stator winding of said motor;
    a position sensor temperature detection unit which detects the temperature indicated by a temperature sensing element incorporated in a position sensor that detects positional information of a rotor of said motor; and
    an alarm signal output unit which outputs an alarm signal when said stator winding temperature exceeds an alarm level, wherein when said ambient temperature is not higher than a prescribed temperature, said alarm level is set equal to a temperature preset based on said ambient temperature and a maximum value of the amount of said temperature change, while when said ambient temperature is higher than said prescribed temperature, said alarm level is set equal to a temperature preset in order to protect said position sensor from overheating.

2. The motor winding overheat prevention apparatus according to claim 1, further comprising a winding protection unit which outputs a command for cutting off drive power to said motor when said alarm signal is received from said alarm signal output unit.

3. The motor winding overheat prevention apparatus according to claim 1, further comprising a switching unit which switches said stator winding temperature to be compared with said alarm level in said alarm signal output unit between said stator winding temperature calculated by said stator winding temperature calculation unit and the temperature indicated by a temperature sensing element mounted on said stator winding.

4. A motor control apparatus for controlling drive power to be supplied to a motor, comprising:
- a current sensing unit which detects current flowing in a stator winding of the motor;
- a stator winding temperature calculation unit which calculates stator winding temperature based on the ambient temperature of said motor and on the amount of change in the temperature of said stator winding that is estimated from said current detected by said current sensing unit;
- a position sensor which detects positional information of a rotor of said motor;
- a temperature sensing element which is incorporated in said position sensor;
- a position sensor temperature detection unit which detects the temperature indicated by said temperature sensing element;
- an alarm signal output unit which outputs an alarm signal when said stator winding temperature exceeds an alarm level, wherein when said ambient temperature is not higher than a prescribed temperature, said alarm level is set equal to a temperature preset based on said ambient temperature and a maximum value of the amount of said temperature change, while when said ambient temperature is higher than said prescribed temperature, said alarm level is set equal to a temperature preset in order to protect said position sensor from overheating; and
- a winding protection unit which outputs a command for cutting off the drive power to said motor when said alarm signal is received from said alarm signal output unit.

5. The motor control apparatus according to claim 4, wherein said prescribed temperature is the ambient temperature of said motor that, when summed with the maximum value of the amount of temperature change of the motor, becomes equal to the actual upper limit temperature of the stator winding.

6. The motor control apparatus according to claim 4, further comprising:
- a position sensor alarm signal output unit which outputs a position sensor alarm signal when the temperature detected by said position sensor temperature detection unit exceeds the temperature preset in order to protect said position sensor from overheating; and
- a position sensor protecting unit which outputs a command for cutting off the drive power to said motor when said position sensor alarm signal is received from said position sensor alarm signal output unit.

7. The motor control apparatus according to claim 4, further comprising a switching unit which switches said stator winding temperature to be compared with said alarm level in said alarm signal output unit between said stator winding temperature calculated by said stator winding calculation unit and the temperature indicated by a temperature sensing element mounted on said stator winding.

8. The motor control apparatus according to claim 4, further comprising a mounting unit for detachably mounting said position sensor.

\* \* \* \* \*